Patented May 31, 1938

2,118,904

UNITED STATES PATENT OFFICE 2,118,904

PROCESS FOR THE MANUFACTURE OF CHLORO-AMINES

Erich Staudt and Gerrit van der Lee, Deventer, Netherlands

No Drawing. Application November 26, 1935, Serial No. 51,715. In Germany December 4, 1934

9 Claims. (Cl. 204—9)

The present invention relates to the manufacture of chloro-amines, especially of mono-chloro-amine ($NH_2Cl$), dichloro-amine ($NHCl_2$), of mixtures of these compounds and of substances containing one or both of these compounds. It is among the objects of the invention to provide a simple, reliable and comparatively inexpensive method of manufacturing the said substances.

Hitherto the chloro-amines have been manufactured as a rule by the interaction of gaseous chlorine and gaseous ammonia, both taken from bombs in which these gases were present in the compressed state. It stands to reason that the handling and transport of the bombs is connected with serious drawbacks and that therefore this known method of manufacture of the chloro-amines is far from being simple.

According to the present invention the chloro-amines may be manufactured in an extremely simple way by the electrolysis of a liquid containing ammonium and chloride ions and preferably moreover a small amount of an added alkaline reacting substance or mixture of alkaline reacting substances. In its simplest form the process according to the invention consists in the electrolysis of a solution containing ammonium chloride and a small amount of one or more added alkaline reacting substances, such as an alkali metal hydroxide, an alkali metal carbonate, ammonia, ammonium carbonate, an oxide or hydroxide of an alkaline earth metal, an alkaline reacting phosphate such as tri- or di-sodium phosphate, an alkali borate, an alkali silicate, an alkali aluminate, or another suitable alkaline reacting substance. It has been found that the nature and the proportion of the alkaline reacting substance is of less importance than the hydrogen ion concentration of the electrolyte. Solutions of ammonium chloride in water have a hydrogen ion concentration, corresponding with a pH lying between about 4 and 6 according to the concentration of the solution, the purity of the ammonium chloride and the composition of the water used for dissolving the salt. By the addition of small amounts of alkaline reacting substances of the types described above the pH is strongly increased.

In tests that have been carried out it was found that in a particular case a solution of 50 grams of ammonium chloride in 1 liter of water, and having a pH of 5.8, yielded on electrolysis a mixture of nitrogen trichloride and chloro-amines. A solution of the same ammonium chloride containing 250 grams of the salt per liter of water had a pH of 5.55 and also yielded a mixture of nitrogen trichloride and chloro-amines when it was subjected to electrolysis. When 2½ grams of sodium carbonate per liter were added to the last mentioned solution, an electrolyte of pH=7.45 was obtained, from which by electrolysis a fair amount of chloro-amines and a very small proportion of nitrogen trichloride was produced; and when the amount of sodium carbonate was increased to 5 grams per liter, the pH rose to 7.65 and no nitrogen trichloride could be found in the products of the electrolysis. However, further tests showed that a still better yield of chloro-amines free from nitrogen trichloride could be reached by increasing the proportion of sodium carbonate until a pH of about 8.0 to 9.0 was reached. Similar observations were made with other solutions of ammonium chloride and other alkaline reacting substances. Thus it is possible to manufacture either mono- and di-chloro-amine exclusively or mixtures of these substances with nitrogen trichloride by varying the pH of the liquid that is submitted to the electrolysis. If it appears to be necessary to maintain exactly certain hydrogen ion concentration in the electrolyte, a suitable buffer may be added, e. g. mixtures of di- and mono-sodium phosphate, mixtures of sodium borate and hydrochloric acid, as well as other known buffering substances that may be used in the pH region that is of importance in the process of the invention. The buffering substances may also be added to the electrolyte continuously or periodically in the course of the electrolysis if necessary, together with a fresh supply of ammonium chloride. As, however, liquids containing ammonium chloride and alkaline reacting substances represent themselves buffers, it will in most cases be superfluous to add an extra buffering substance or mixture to the electrolyte.

The invention in its broadest form covers the manufacture of chloro-amines and substances containing chloro-amines by the electrolysis of liquids containing ammonium and chloride ions and having a hydrogen concentration corresponding to a pH lying between the one of solutions of ammonium chloride and a pH of about 10.0 attained by the addition of one or more alkaline reacting substances to the liquid containing ammonium and chloride ions. In its preferred embodiment the process of the invention consists in the manufacture of chloro-amines and of substances containing chloro-amines by the electrolysis of solutions containing ammonium chloride and an alkaline reacting substance of the type described, which solutions have a pH of about 7.6 to 8.8. It has been found that in this region the highest yields of chloro-amines are obtained. Electrolytes having a higher pH yield smaller quantities of chloro-amines, and electrolytes with a lower pH yield mixtures of chloro-amines and nitrogen trichloride.

The concentration of the ammonium and chloride ions in the electrolyte may vary between broad limits, e. g., solutions of 5 to 250 grams ammonium chloride per liter have proven to be suitable for the purpose of the invention. Good yields have been obtained with widely divergent current densities, e. g., lying between 0.01 and 0.50 ampere per cm$^2$.

The electrolysis according to the invention may be carried out in electrolyzing vessels of various shapes. In tests that have been carried out excellent results have been obtained as well with high and small cells as with low and shallow vessels. Generally speaking, the types of electrolyzing cells that have proven to be suitable for the electrolysis of solutions of alkali chloride in the electrochemical manufacture of hypochlorites and chlorates may be used in the process of the invention. Plants in which the electrolyte continually enters the cell at one place and leaves it after having been enriched with chloro-amines at another place are suitable especially in those cases where the liquids containing the chloro-amines are, or must be, applied without further concentration or purification for sterilizing and disinfecting purposes. Preferably the electrolyzing vessels are hermetically closed and are provided with means for carrying off the gases developed in the electrochemical process. These gases may be drawn off together with the electrolyzed liquid or may be sucked away separately with the aid of a pump or with the aid of air or another gas that is blown or sucked through the electrolyte. As a matter of fact as far as these gases contain useful compounds, e. g., chloro-amines or nitrogen trichloride, they may be conducted to such places where they may be applied, e. g., for bleaching or sterilizing purposes.

The material of the cells has to be resistant to the electrolyte and to the products of the electrolysis. Stone-ware, ebonite, artificial resins and other materials that are not attacked by chlorides, dilute alkali and solutions containing chloro-amines and nitrogen trichloride may be used.

Materials that have proven to be successful in other electrolyzing processes in which halogens or halogen compounds play a role may also be used as materials for electrodes in the process of the present invention. Excellent results have been obtained with dense graphite rods and plates, with alloys of iron and silicon, containing a large proportion of the last mentioned element and with magnetite ($Fe_3O_4$). Moreover platinum may be used as electrode material. Known means for preventing cathodic reduction of the chloro-amines formed may be applied in the process of the invention, e. g., the cathode may be covered with asbestos or one may wrap asbestos cord around the cathode.

We claim:

1. Process for producing a chloro-amine which comprises electrolyzing an aqueous solution containing ammonium chloride having a pH within the range of from 7.6 to 8.8 inclusive.

2. Process for producing a chloro-amine which comprises electrolyzing an aqueous solution containing ammonium and chloride ions having a pH which is not lower than 7.45 and maintaining such pH during the electrolysis.

3. Process for producing a chloro-amine which comprises electrolyzing an aqueous solution containing ammonium chloride having a pH which is not lower than 7.45 and maintaining such pH during the electrolysis.

4. Process for producing a chloro-amine which comprises electrolyzing an aqueous solution containing ammonium and chloride ions having a pH within the range of from 7.6 to 8.8 inclusive.

5. Process for producing a chloro-amine which comprises electrolyzing an aqueous solution containing ammonium chloride having a pH within the range of from 7.6 to 8.8 inclusive, and maintaining the pH of the solution within said range during the electrolysis.

6. Process for producing a chloro-amine which comprises electrolyzing an aqueous solution containing ammonium and chloride ions having a pH which is not lower than 7.45.

7. Process for producing a chloro-amine which comprises electrolyzing an aqueous solution containing ammonium chloride having a pH which is not lower than 7.45.

8. Process of producing a chloro-amine which comprises electrolyzing an aqueous solution containing ammonium and chloride ions having a pH which is not lower than 7.65.

9. Process of producing a chloro-amine which comprises electrolyzing an aqueous solution containing ammonium chloride having a pH which is not lower than 7.65.

ERICH STAUDT.
GERRIT VAN DER LEE.